United States Patent
Song et al.

(10) Patent No.: US 11,192,335 B2
(45) Date of Patent: Dec. 7, 2021

(54) POLYMERIC FOAM BOARD WITH FLEXIBLE WATER RESISTANT INTUMESCENT COATING

(71) Applicant: DDP SPECIALTY ELECTRONIC MATERIALS US, LLC., Wilmington, DE (US)

(72) Inventors: Xiaomei Song, Shanghai (CN); Dakai Ren, Midland, MI (US); Hongyu Chen, Zhanjiang (CN); Jeffrey M. Alcott, Midland, MI (US); Mark A. Barger, Midland, MI (US); Yi Zhang, Shanghai (CN); Ernest J. Herst, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 97 days.

(21) Appl. No.: 15/780,656

(22) PCT Filed: Jan. 16, 2017

(86) PCT No.: PCT/US2017/013641
§ 371 (c)(1),
(2) Date: Jun. 1, 2018

(87) PCT Pub. No.: WO2017/131995
PCT Pub. Date: Aug. 3, 2017

(65) Prior Publication Data
US 2018/0355140 A1   Dec. 13, 2018

Related U.S. Application Data

(60) Provisional application No. 62/288,474, filed on Jan. 29, 2016.

(51) Int. Cl.
| | |
|---|---|
| *C08J 9/36* | (2006.01) |
| *C09D 5/18* | (2006.01) |
| *C09D 175/08* | (2006.01) |
| *C09D 175/06* | (2006.01) |
| *B32B 9/04* | (2006.01) |
| *B32B 27/20* | (2006.01) |

(52) U.S. Cl.
CPC .............. *B32B 9/046* (2013.01); *B32B 27/20* (2013.01); *C09D 5/185* (2013.01); *C08J 2300/22* (2013.01); *C08J 2300/24* (2013.01); *Y10T 428/25* (2015.01)

(58) Field of Classification Search
CPC .... C09D 175/06; C09D 175/08; C09D 5/185; C08J 9/365; C08J 2300/24; C08J 2300/22; C08J 2325/06; C08J 2475/06; C08J 2475/08
See application file for complete search history.

(56) References Cited

U.S. PATENT DOCUMENTS

| | | | | |
|---|---|---|---|---|
| 4,725,457 A | * | 2/1988 | Ward | C08G 12/40 427/385.5 |
| 9,097,011 B1 | | 8/2015 | Barone et al. | |
| 2005/0009966 A1 | | 1/2005 | Rowen | |
| 2009/0309077 A1 | | 12/2009 | Gupta et al. | |
| 2011/0313084 A1 | | 12/2011 | Furar et al. | |
| 2012/0301621 A1 | | 11/2012 | Dombrowski et al. | |
| 2014/0163167 A1 | | 6/2014 | Lagrange et al. | |
| 2015/0291724 A1 | * | 10/2015 | Kusano | C09D 175/06 524/591 |

FOREIGN PATENT DOCUMENTS

| | | |
|---|---|---|
| CN | 104845465 | 8/2015 |
| EP | 0891860 A2 | 1/1999 |
| EP | 0891860 A3 | 4/2000 |
| IN | 2658/CHENP/2013 | 7/2014 |
| JP | 2014524954 A | 9/2014 |
| JP | WO2014162718 A1 | 10/2014 |
| WO | 2006/096112 A1 | 9/2006 |
| WO | 2012/051135 A1 | 4/2012 |
| WO | 2013/003232 A1 | 1/2013 |

OTHER PUBLICATIONS

D.W. Krassowski, D.A. Hutchings & S.P. Qureshi; Expandable Graphite Flake as an Additive for a New Flame Retardant Resin; 1996; Fire Retardant Chemicals Association; pp. 137-146.

* cited by examiner

*Primary Examiner* — Cheng Yuan Huang

(57) ABSTRACT

An article contains a polymeric foam board having a primary surface and an intumescent coating on a primary surface of the polymeric foam board, the intumescent coating containing a polymeric binder, expandable graphite particles, a phosphorous material and a boron-containing compound and wherein the article is free of an object that is in contact with the intumescent coating and that sandwiches the intumescent coating between it and the polymeric foam board and wherein the intumescent coating has a tensile elongation of at least 50 percent and less than 100 percent at 23 degrees Celsius as measured according to ISO 37, has a storage modulus of less than $1\times10^6$ Pascals at 250 degrees Celsius, is halogen-free, free of sodium silicate, free of polyurea elastomer, and free of formals of pentaerythritol and dipentaerythritol.

7 Claims, 1 Drawing Sheet

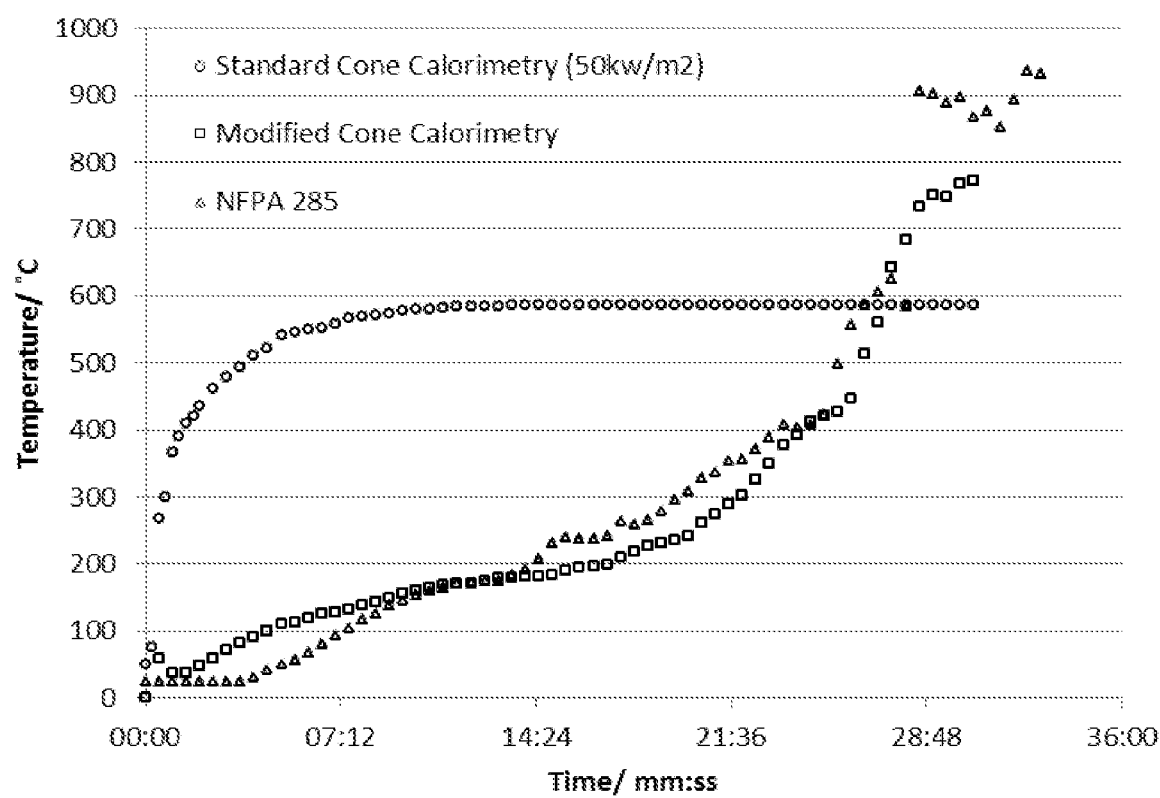

POLYMERIC FOAM BOARD WITH FLEXIBLE WATER RESISTANT INTUMESCENT COATING

BACKGROUND OF THE INVENTION

Field of the Invention

The present invention relates to a polymeric foam board with an intumescent coating that qualifies as a water resistant coating.

Introduction

Intumescent coatings serve to increase the fire resistance of a substrate to which the coating is applied. Intumescent coatings provide fire protection by expanding to produce an insulating layer of char over a substrate when exposed to heat. For the intumescent coating to be effective, the insulating layer of char needs to have enough strength (integrity) to remain in place and insulating effect so as to protect the substrate it is coating from experience damage resulting from exposure to high temperatures.

Historically, intumescent coatings comprise three components: (a) an acid source, which is generally ammonium polyphosphate (APP); (b) a carbon source, such as (di) pentaerythritol; and (c) a gas source (blowing agent). Intumescent coatings have an intumescing activation temperature at which they initiate expansion and char formation to protect the substrate beneath the coating. Typically, intumescing activation temperatures are above 250 degrees Celsius (° C.). Such an intumescing activation temperature is too high to protect polymeric foam board, particularly thermoplastic polymer foam board. It is desirable to identify intumescent coating compositions that are suitable for use on polymeric foam boards, particularly thermoplastic polymer foam boards. Moreover, it is desirable to identify such formulations that are halogen-free to avoid environmental concerns with halogens.

Intumescent coatings are often rigid coatings. Rigid coatings have an elongation at room temperature (23° C.) of less than 75 percent (%), generally of 50% or less according to ISO 37. Rigid intumescent coatings are undesirable for use on polymeric foam board in exterior insulation applications on building structures. Building structure tend to move over time, such as racking movements in heavy winds. As a result, rigid coatings over polymeric foam board applied to the exterior of the building will tend to crack as the building structure racks or moves in other ways. Cracks in the coating are undesirable because they create air and moisture leaks through the intumescent coating and can result in crumbling of the intumescent coating from the polymeric foam board. Therefore, it is desirable to identify a flexible intumescent coating for polymeric foam board to avoid crack formation in the coating during movement of buildings on which polymeric foam boards coated with the intumescent coating reside.

Intumescent coatings typically degrade when exposed to moisture. Moisture causes hydrophilic components in the coatings to lose mechanical properties and fire protection performance. As a result, intumescent coatings are generally not suited for exterior exposure due to their lack of water resistance. Nonetheless, there are applications where polymeric foam board is applied to the exterior of a building. Additionally, it would simplify the building construction process to be able to use an intumescent coating both as a flame retardant over the polymeric foam board and as a water resistant barrier over the polymeric foam board. However, to qualify as a "water resistant barrier" the coating will need to demonstrate water resistance under ASTM D870 testing. Intumescent coatings are not known to be water resistant so this is a challenging hurdle.

Moreover, intumescent coatings often require a blowing agent or an expansion agent, other than expandable graphite, that is or forms a gas at an onset temperature to expand and foam the coating at an onset temperature. It would simplify intumescent coating technology to eliminate the need for a blowing agent other than expandable graphite.

It would advance the art of building construction to identify an intumescent coating suitable for use on a polymeric foam board, particularly a thermoplastic foam board, and that is halogen-free, has an tensile elongation of at least 50% at 23° C., and that demonstrates water resistance under ASTM D870 testing. Such an intumescent coating would be suitable for use over polymeric foam boards on the exterior of building structures without having to have an additional coating sandwiching the intumescent coating between it and the polymeric foam board.

BRIEF SUMMARY OF THE INVENTION

The present invention provides an intumescent coating suitable for use on a polymeric foam board, particularly a thermoplastic foam board, and that is halogen-free, has an tensile elongation of at least 50%, preferably 70% or more, more preferably at least 100% at 23° C., and demonstrate water resistance under ASTM D870. The tensile elongation characteristic of the intumescent coating enables the coating to remain affixed to a substrate on a building structure even as the building structure moves and shifts slightly over time. Moreover, the present invention does not require (and can be free of) any blowing or expansion agent other than expandable graphite in the intumescent coating.

In order to be suitable for use on a polymeric foam board, particularly a thermoplastic foam board, the intumescent coating needs to keep the surface of the foam board on which it resides to a temperature of 400 degrees Celsius (° C.) or less for 30 minutes in a Modified Cone calorimetry Test as described herein. Such a test creates a surface temperature profile similar to that of the complex full wall assembly test of NFPA 285, but without requiring the complexity and cost associated with the NFPA 285 testing. If the intumescent coating allows a foam surface temperature beneath the char in the Modified Cone calorimetry Test then it is expected that the foam would be ignite or excessively char during the NFPA 285 full wall test.

The present invention is a result of surprisingly discovering a combination of components that serve as an intumescent coating with the needed onset temperature, necessary tensile elongation to be flexible and yet is water resistant. The intumescent coating composition requires use of expandable graphite with an onset temperature suitable for use with polymeric foam board, a polymeric binder having particular tensile elongation for flexibility, yet particular storage modulus beginning at the onset temperature to sustain binding of the expandable graphite as it expands and that is sufficiently hydrophobic so as to achieve be water resistant.

In a first aspect, the present invention is an article comprising a polymeric foam board having a primary surface and an intumescent coating on a primary surface of the polymeric foam board, the intumescent coating comprising: (a) a polymeric binder; (b) expandable graphite particles dispersed within the polymeric binder, the expandable graphite having an onset temperature in a range of 150 to 200 degrees Celsius as determined by thermal mechanical analysis, an average particle size in a range of 0.07 to 0.60 millimeters as determined according to ASTM D1921-06 and a concentration of 15 to 80 weight-percent based on total weight of intumescent coating; (c) a phosphorous material that provides phosphorous at a concentration of 2 to 15 weight-percent based on total weight of intumescent coating; and (d) a boron-containing compound that provides a boron concentration in a range of greater than zero to two weight-percent based on total intumescent coating weight; where the article is free of an object that is in contact with the intumescent coating and that sandwiches the intumescent coating between it and the polymeric foam board and wherein the intumescent coating has a tensile elongation of at least 50 percent and less than 100 percent at 23 degrees Celsius as measured according to ISO 37, has a storage modulus of less than $1 \times 10^6$ Pascals at 250 degrees Celsius, is halogen-free, free of sodium silicate, free of polyurea elastomer, and free of formals of pentaerythritol and dipentaerythritol.

Such an intumescent coating is suitable for use over polymeric foam boards on the exterior of building structures without having to have an additional coating sandwiching the intumescent coating between it and the polymeric foam board.

BRIEF DESCRIPTION OF THE DRAWINGS

FIG. 1 illustrates a plot of data representing the temperature profiles of an intumescent coating over polymeric foam from (a) Standard Cone calorimetry; (b) Modified Cone calorimetry as described herein; and (c) NFPA 285 testing.

DETAILED DESCRIPTION OF THE INVENTION

"And/or" means "and, or alternatively". Ranges include endpoints unless otherwise stated.

Test methods refer to the most recent test method as of the priority date of this document unless a date is indicated with the test method number as a hyphenated two digit number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standardization. NFPA refers to National Fire Protection Association.

The article of the present invention comprises a polymeric foam board. A foam board has three orthogonal dimensions: thickness, width and length. The thickness is equal to the smallest of the three dimensions. The length is equal to the largest of the three dimensions and is generally larger than the thickness. A foam board has at least one and generally has two opposing primary surfaces. A primary surface is a surface of the foam board that has a planar surface area equal to the largest planar surface area of any surface of the foam board. A planar surface area is a surface area of a surface as projected onto a plane so as to eliminate effects due to contours (for examples, peaks or valleys) on the surface. When a foam board has two opposing primary surfaces, the thickness dimensions extends between the opposing primary surfaces and orthogonal to at least one of them. Desirably, the polymeric foam board has opposing primary surfaces that are rectilinear (that is, comprising right angles) such as square or rectangular.

The polymeric foam board can be a thermoplastic foam board or a thermoset foam board. A thermoplastic polymer foam board comprises a thermoplastic polymer matrix that defines multiple cells therein and can be melted. Examples of thermoplastic polymer foam boards include polystyrenic foam boards, polyethylene foam boards, polypropylene foam boards, and polyester foam boards. A thermoset polymer foam board comprises a thermoset polymer matrix that defines multiple cells therein and cannot be melted. Thermoset foam boards typically comprise a crosslinked polymer matrix. Examples of thermoset polymer foam boards include polyisocyanurate foam boards.

The polymeric foam board can be an extruded foam board, and expanded foam board, a cast foam board or any other type of foam board. Extruded foam board is made by continuously extruding a foamable polymer mixture through a die and allowing the mixture to expand and cool into polymeric foam board. Expanded polymeric foam board is made by heading expandable polymer foam beads in a mold so as to cause them to expand and fuse together to form an article in the shape of the mold. Expanded polymeric foam board is characterized by comprising a plurality of groups of cells surrounded by a skin throughout the foam board. Each group of cells and skin corresponds to what was an expandable foam bead. Extruded foam board is distinct from expandable foam board by not having such groupings of cells surrounded by a skin. The skin has a density greater than the average cell wall density. Cast foam board is made by pouring a reactive foam mixture into a mold or onto a surface and allowing the mixture to expand and set into a polymeric foam board. Typically, cast foam board is thermoset polymer foam board and the mixture cures as it expands.

Desirably, the polymeric foam board is selected from extruded and expandable polystyrenic foam boards. Polystyrenic foam boards comprise a polymer matrix of styrenic homopolymer, styrenic copolymer or combinations thereof. Examples of desirably styrenic copolymers include styrene-acrylonitrile copolymers, styrene-maleic anhydride copolymers, and styrene-acrylic acid copolymers.

Desirably, the polymeric foam board comprises 50 wt % or more, preferably 60 wt % or more and can comprise 70 wt % or more 80 wt % or more 90 wt % or more and even 95 wt % or more or 100 wt % of styrenic polymer based on total polymer weight in the polymeric foam board.

The polymeric foam board desirably has a density of 64 kilograms per cubic meter ($kg/m^3$) or less, preferably 48 $kg/m^3$ or less and at the same time typically has a density of 5 $kg/m^3$ or more, 10 kg/m3 or more and even 20 $kg/m^3$ or more. Lower density foam tends to have high insulating properties so desirably the density is 64 kg/m3 or less. At the same time higher density foam tends to have higher strength and durability so it is desirably to have a density of 5 $kg/m^3$ or more. Foam density, as referred to herein, is measured according to ASTM D1622.

The polymeric foam board is desirably used as thermal insulating material. In that regard, it is desirable that the polymeric foam board have a thermal conductivity of 0.0500 Watts per meter*Kelvin (W/m*K) or less, preferably 0.0465 W/m*K or less, more preferably 0.0400 W/m*K or less, even more preferably 0.0300 W/m*K or less and at the same time typically has a thermal conductivity of 0.0200 W/m*K or more. Thermal conductivity, as used herein, is determined according to ASTM C518.

The polymeric foam board is desirably not so bulky as to inhibit efficient wall construction but at the same time is desirably thick enough so as to contribute thermal insulating properties to a wall. Therefore, the polymeric foam board is typically 12 millimeters (mm) or more, preferably 24 mm or more, more preferably 48 mm or more and can be 96 mm or more, 125 mm or more in thickness while at the same time is generally 500 mm or less in thickness, more typically 150 mm or less in thickness.

The polymeric foam board has an intumescent coating on primary surface of the foam board. Desirably, the intumescent coating covers an entire primary surface of the foam board. Desirably, the intumescent coating is free of perforations through the intumescent coating in order to achieve the greatest water resistant barrier for the polymeric board it covers. Unlike other intumescent coatings, the composition of the present intumescent coating enables it to surprisingly impart both water resistant to the polymeric foam board on which it is coated as well as flame resistant properties to the polymeric foam board. Moreover, the present intumescent coating is able to accomplish these objectives while being halogen-free.

The intumescent coating comprises (a) a polymeric binder; (b) expandable graphite particles; (c) a phosphorous material; and (d) a boron-containing material. The intumescent coating achieves a tensile elongation of at least 50%, preferably 60% or more, more preferably 70% or more, even more preferably 80% or more and even more preferably 90% or more while at the same time 100% or less at 23° C.; a storage modulus of less than $1 \times 10^6$ Pascals at 250 degrees Celsius; and demonstrates water resistance under ASTM D870. This combination of properties renders the intumescent particularly valuable improvement over other intumescent coatings in the industry. The tensile elongation property enables the coating to expand and contract with movement in a building structure comprising a polymeric foam board with the intumescent coating covering a primary surface of the foam board without causing the intumescent coating to crack. However, too much elongation results in poorly insulating char. The storage modulus value enables the intumescent coating to expand in a stable way to form an insulating char when exposed to elevated temperatures thereby protecting the polymeric foam on which the coating resides from excessive heat. The water resistance property is a particularly desirable and unique property for an intumescent coating and enables the coating to remain exposed to weather with a reduced likelihood of deteriorating.

The polymeric binder forms a matrix that holds together the other components of the intumescent coating. The polymeric binder has tensile elongation and storage modulus values that provide the intumescent coating with tensile elongation and storage modulus values that are within specific ranges.

The intumescent coating has a tensile elongation of 50 percent (%) or more, preferably 60% or more, more preferably 70% or more, yet more preferably 80% or more, even more preferably 90% or more while at the same time has a tensile elongation of 100% or less and can have a tensile elongation of 90% or less, 80% or less and even 70% or less. By having such a high tensile elongation the intumescent coating is flexible enough to remain adhered to the foam board even when the foam board is attached to a building structure that moves over time (for example, racks in the wind or shifts slightly during settling of the foundation). By having a tensile elongation below 100% the resulting char is suitably thermally insulating to protect the foam board over which the coating resides.

To achieve such a tensile elongation value in the intumescent coating, the polymeric binder is desirably selected from polymers having a tensile elongation value of 50% or more, preferably 100% or more, more preferably 200% or more, yet more preferably 300% or more, even more preferably 400% or more while at the same time is generally 1000% or less, more typically 900% or less, even more typically 800% or less and yet more typically 700% or less. The intumescent coating itself contains non-flexible components (such as the expandable graphite) and so, actually, the polymeric binder desirably has a tensile elongation even higher than the intumescent coating.

As used herein, "tensile elongation" is measured according to ISO 37 using an Instron 5565 equipped with pneumatic grips, 2712-003 with maximum pressure at 600 kiloPascals, maximum load at one kiloNewton and a testing temperature of 23° C. Prepare test bars according to ISO 37 with 4.0 mm width, 1.0 mm thickness and 75 mm length and use a loading rate of 50 millimeters per minute.

At the same time as having the above-described tensile elongation values, the intumescent coating has a storage modulus of less than one megaPascal ($10^6$ Pascal), preferably $10^5$ Pascals or less, more preferably $10^4$ Pascals or less and more preferably $5 \times 10^3$ Pascals or less, even $10^3$ Pascals or less and generally $10^2$ Pascals or more, generally $10^3$ Pascals or more at 250° C. To achieve such a storage modulus in the intumescent coating, the binder is desirably selected from polymers having a storage modulus in a similar range as that described for the intumescent coating. Storage modulus is measured using oscillatory rheology, representing the elastic response of the material. It has been discovered that a storage modulus in the described range is needed to achieve high expansion and a stable froth during intumescence in order to protect the polymer foam on which it resides from excessive heat to effectively serve as a fire retardant.

Determine storage modulus for as referred to herein using dynamical mechanical analysis (DMA). Test samples using oscillatory rheology with a TA Instruments ARES-G2 rheometer equipped with a 25 millimeter (mm) stainless parallel plate geometry (gap of 1.5 mm). Prior to testing, sandwich specimens between the parallel plates and heat to 150° C. with the auto-tension activated in compression mode to ensure a good contact with the plates. Decrease the temperature to 60° C. and allow to reach thermal equilibrium for five minutes before starting the test. Test using a two-step procedure: small strain of 0.1% from 60° C. to 150° C. at 3° C. per minute and larger strain of one % from 150° C. to 280° C. at 3° C. per minute with a frequency at 6.28 radians per second.

Desirably, the polymeric binder is selected from polyurethane, acrylate, vinyl-acrylic, epoxy, latex polyurethane hybrid, latex epoxy hybrid and polyurethane-urea polymers. Examples of polymer compositions that achieve the necessary tensile elongation and storage modulus for the polymeric bonder include polyurethanes comprising an isocyanate component and a flexible polyol component.

The polymeric binder can be applied to a polymeric foam board in the form selected from a group consisting of one component water borne polyurethane, two component polyurethane, latex emulsion, latex polyurethane hybrid emulsion, or latex epoxy hybrid emulsion (see, for example US2012/0301621 for teachings on latex epoxy hybrid emulsions), or polyurethane-urea.

The polymeric binder is generally present at a concentration of 20 wt % or more, and can be present at a concentration of 30 wt % or more, even 35 wt % or more or 40 wt % or more and at the same time is generally present at a concentration of 80 wt % or less, and typically 70 wt % or less and can be present at a concentration of 65 wt % or less. Concentration of binder is relative to total intumescent coating weight using thermogravimetric analysis according to ASTM E1131. Herein, reference to intumescent coating weight refers to the weight of the intumescent coating on the polymeric foam board as opposed to in a formulation for application to a foam board. That means, any aqueous carrier in an intumescent coating formulation for applying to a foam board is not included in the intumescent coating weight, only solids components are included in the intumescent foam weight.

Desirably, the binder is present in the intumescent coating at a concentration of 30 wt % or more, preferably 40 wt % or more and can be present at 50 wt % or more and even 60 wt % and at the same time is typically present at a concentration of 60 wt % or less, more typically 50 wt % or less with wt % relative to total intumescent coating weight.

The expandable graphite particles of the intumescent coating provide the expansion of the coating at a desirable onset temperature and provide a carbon-source for the coating. Expandable graphite particles are graphite particles (also called "flake") that have been intercalated by exposure to acid. Expandable graphite expands when exposed to heat. The temperature at which expandable graphite begins to expand is the "onset: temperature (also known as the "critical" temperature or "activation" temperature) of the expandable graphite. Determine the onset temperature for expandable graphite by identifying what temperature is required to achieve 1% volume expansion as determined by thermal mechanical analysis (0.02 Newton normal force with a temperature ramping rate of 5° C. per minute). The expandable graphite of the present invention has an onset temperature of 200° C. or lower and generally has an onset temperature of 150° C. or higher.

It is important for the intumescent coating to expand at a temperature low enough to provide an insulating layer to protect the polymeric foam over which the coating resides from an extent of heat that would melt or deteriorate in some other way the polymeric foam. If the onset temperature of the intumescent coating is too high, the polymeric foam will deteriorate before the intumescent coating can protect it from damage. Therefore, the onset temperature of an intumescent coating must be matched to the type of material the intumescent coating protects. The onset temperature needed for polymeric foam, for example, is significantly lower than the onset temperature needed for steel girders. Discovering the required onset temperature for polymeric foam and what material could introduce such an onset temperature to an intumescent coating over the foam was part of the challenge of the present invention. Not all expandable graphite particles, for example, have the same onset temperature. Therefore, it is necessary to use an expandable graphite with a specific onset temperature in the intumescent coating of the present invention.

Expandable graphite particles are present in the intumescent coating at a concentration of 15 wt % or more, preferably 20 wt % or more and can be present at a concentration of 25 wt % or more, 30 wt % or more, 35 wt % or more, 40 wt % or more, even 50 wt % or more and at the same time is typically present at a concentration of 80 wt % or less, and can be present at a concentration of 70 wt % or less, 60 wt % or less, even 50 wt % or less. Determine wt % expandable graphite particles relative to total weight of intumescent coating on the polymeric foam board using a thermogravimetric analysis method (ASTM E1131).

Desirably, the expandable graphite particles have an average particle size of 0.07 millimeters (mm) or more, and can have an average particle size of 0.10 mm or more, 0.15 mm or more, 0.20 mm or more, 0.25 mm or more, 0.30 mm or more, 0.40 mm or more, even 0.50 mm or more and at the same time typically has an average particle size of 0.60 mm or less and can have an average particle size of 0.50 mm or less, 0.40 mm or less, 0.35 mm or less or even 0.30 mm or less. Determine average particle size of for the expandable graphite according to ASTM D1920-06.

The phosphorous material is a material that contains phosphorous. Examples of suitable phosphorous materials include any one or any combination of more than one material selected from a group consisting of ammonium polyphosphate phase I, ammonium polyphosphate phase II, melamine formaldehyde resin modified ammonium polyphosphate, silane modified ammonium polyphosphate, melamine polyphosphate, bisphenol A bis(diphenyl phosphate), cresyldiphenyl phosphate, dimethylpropane phosphonate, polyphosphonates, metal phosphinate, phosphorous polyol, phenyl phospholane, polymeric diphenyl phosphate, resorcinol-bis-diphenylphosphate, triethyl phosphate, tricresyl phosphate, triphenyl phosphate, red phosphors, phosphate acid, ammonium phosphate. The amount of phosphorous material is selected so as to provide a phosphorous concentration of two wt % or more, preferably three wt % or more, more preferably four wt % or more, five wt % or more, six wt % or more seven wt % or more, eight wt % or more, nine wt % or more, 10 wt % or more and at the same time is selected so as to provide a phosphorous concentration of 15 wt % or less, 14 wt % or less 13 wt % or less, 12 wt % or less, 11 wt % or less or even 10 wt % or less. Determine wt % phosphorous relative to total weight of intumescent coating using X-ray fluorescence as described in ASTM D7247-10.

The intumescent coating further comprises a boron-containing material. The boron containing material can be the polymeric binder, the phosphorous material, or a material distinct from the polymeric binder, phosphorous material and expandable graphite. The boron-containing material desirably has a sintering temperature of 400° C. or higher, and can be 450° C., even 550° C. or higher and is generally 600° C. or lower. Sintering temperature refers to the temperature at which grains of solid formed from powder start connecting through their boundaries and begin merging into a single material. The sintering temperature is the temperature is 70-90% of the melting temperature of the material as determined by differential scanning calorimetry. Sintering of the boron material adds strength to the expanded coating char formed by the intumescent coating thereby reinforcing the insulating effect of the charred coating, and thereby increasing the thermal protection of the polymeric foam on which the coating resides. Examples of suitable boron-containing materials include any one or any combination of more than one material selected from a group consisting of zinc borate, boric acid, and boric oxide. Desirably, the boron-containing material is present at a concentration that provide boron at a concentration of two wt % or less and possibly 1.5 wt % or less, one wt % or less, even 0.5 wt % or less while at the same time is present at a concentration of zero wt % or more and can be present at a concentration of 0.5 wt % or more. Determine wt % of boron relative to total weight of intumescent coating using X-ray fluorescence.

The intumescent coating can comprise additional flame retardant additives in addition to those already mentioned. As examples of suitable additional flame retardant additives include any one or any combination of more than one material selected from a group consisting of bisphenol A bis(diphenyl phosphate); cresyldiphenyl phosphate; dimethylpropane phosphonate; polyphosphonates; metal phosphinate; phosphorus polyol; phenyl phospholane; polymeric diphenyl phosphate; resorcinol-bis-diphenylphosphate; triethyl phosphate; tricresyl phosphate; triphenyl phosphate; trichlorophosphate; triethyl phosphate; red phosphorous; phosphate acid; ammonium phosphate; boehmite; aluminum hydroxide; magnesium hydroxide and antimony trioxide. Phosphorous-containing flame retardants are considered phosphorous material as described above.

The intumescent coating can optionally contain fillers or other additives depending on the properties sought.

The intumescent coating is, however, halogen-free as determined by X-ray fluorescence. The intumescent coating is also free of sodium silicate, polyurea elastomer and formals of pentaerythritol and dipentaerythritol. A "formal" is a reaction product of formaldehyde and aliphatic hydroxyl compounds.

The intumescent coating can be applied to the polymeric foam board, for example, as a water based system or as a solvent-free system. Water based systems comprise the solids of the intumescent coating dispersed in an aqueous continuous phase. Typically, the polymeric binder is in the form of a dispersion or latex. The aqueous system is applied to the polymeric foam board by, for example, spraying, brushing or any other means of application. As the water evaporates the polymeric binder forms a film over the foam board that incorporates the other components of the intumescent coating. The solvent-free system generally has a binder system, such as a two-component (2k) polyurethane system, that reacts to form a polymeric binder. The intumescent materials are included in one or more of the reactive components and then the reactive components are combined just prior or during application to a polymeric foam board. As with the aqueous based system, the solvent-free system can be sprayed, brushed or applied in any other way to a polymeric foam board surface. The solvent-free system generally offers advantages of faster drying times and/or lower costs relative to water based coating systems.

Desirably, the intumescent coating is applied over the primary surface of a polymeric foam board so as to achieve a dry thickness over the primary surface that is 0.6 millimeters (mm) or greater, preferably 0.8 mm or greater, more preferably 1.0 mm or greater and can be 1.2 mm or greater, 1.4 mm or greater, and even 1.6 mm or greater while at the same time is typically 4.0 mm or less, more typically 3.0 mm or less, even more typically 2.0 mm or less and can be 1.8 mm or less, 1.6 mm or less, 1.4 mm or less, 1.2 mm or less and even 1.0 mm or less.

The article of the present invention is free of an object in contact with the intumescent coating and that sandwiches the intumescent coating between it and the polymeric foam board. For example, some articles can comprise foam board coated with an intumescent coating and include a metal liner that covers the intumescent coating and sandwiches the intumescent coating between the metal liner and foam board. The present invention is free of any such object. The article of the present invention can be free of objects that sandwich the intumescent coating between it and the polymeric foam board even if the object does not touch the intumescent coating. The intumescent coating of the present invention provides sufficient flame retardancy and water resistance so as to be able to remain exposed on the foam board and still demonstrate water resistance and provide flame retardant protection to the polymeric foam board it is coated on. At the same time, the intumescent coating desirably enables the foam board to achieve an E-84 Class A rating in fire performance.

The article of the present invention can comprise an intumescent coating over a single polymeric foam board or can comprising a single intumescent coating over multiple polymeric foam boards. For example, the article can be a single polymeric foam board with a single, continuous intumescent coating covering a primary face of the foam board. Multiple such foam boards can be assembled together on a building framework to provide an insulated and flame retardant wall. As another example, multiple foam boards can be assembled together on a building framework to provide an insulated wall and a single intumescent coating can be applied over multiple foam boards of the insulated wall. The latter example has the benefit of having continuous intumescent coating extending over seams between foam boards.

EXAMPLES

Water Based Intumescent Coatings

Table 1 contains a description of the components used to prepare Comparative Examples (Comp Exs) A-D and Examples (Exs) 1-5 using a water based intumescent coating.

TABLE 1

| Component | Description |
|---|---|
| Polymeric Binder 1 | A 50 wt % aqueous dispersion of an acrylic-epoxy hybrid derived from a thermoplastic acrylic-based polymer (butyl acrylate-methyl methacrylate copolymer, 50/50 w/w) imbibed with a thermosettable epoxy compound (liquid epoxy D.E.R. 331). Acrylic/Epoxy weight fraction is 70/30. Weight average molecular weight ca. 250,000, with an equivalent epoxy weight of 1200. Mean particle size ca. 250 nm. D.E.R. is a trademark of Dow Chemical Company. |
| Polymeric Binder 2 | An aqueous latex (50 wt % solids) of butylacrylate/acrylonitrile copolymer (90/10 weight ratio of butylacrylate to acrylonitrile) For example, ELASTENE ™ 2468M acrylic emulsion. ELASTENE is a trademark of Rohm and Haas Company. |
| Polymeric Binder 3 | A 40 wt % aqueous dispersion of an aliphatic polyurethane derived from 68 wt % Isophorone Diisocyanate, and 32 wt % of a linear polyester diol derived from caprolactone, terminated by primary hydroxyl groups (molecular weight of 2000, OH number = 56). Mean particle size ca. 50 microns, weight average molecular weight ca. 100,000 g/mol. |
| Polymeric Binder 4 | An aqueous dispersion of an aliphatic polyurethane-acrylic hybrid comprising as solids 60 wt % aliphatic polyurethane derived from Isophorone Diisocyanate and polycaprolactone (weight average molecular weight = 92,000 g/mol) and 40 wt % butylacrylate/methylmethacrylate copolymer (BA/MMA wt. ratio = 74/26, weight average molecular weight = 600,000 g/mol). Dispersion is 41 wt % solids. |
| Polymeric Binder 5 | A high solids content aqueous polyurethane dispersion made from MDI (methylene diphenyl diisocyanate) and polyether polyols. For Example, SYNTEGRA ™ YS3000 Waterborne Polyurethane Dispersion. (SYNTEGRA is a trademark of The Dow Chemical Company). |
| Expandable Graphite | Expandable graphite flake having a neutral surface, an onset temperature of 160° C. and an average particle size of 350 micrometers (50 mesh). For example, Grafguard ™ 160-50N graphite flake (Grafguard is a trademark of Graftech International Holdings, Inc.) |
| Phosphorous Material 1 | Melamine formaldehyde coated ammonium polyphosphate. For example, JLS-APP104MF from Hangzhou JLS Chemical Company, China. |
| Boron-containing material | Zinc borate with an average particle size of 2-3 micrometers and a density of 2.67 grams per cubic meter. |
| Dispersant | Polyacrylate dispersant containing 45 wt % propenoic acid |

TABLE 1-continued

| Component | Description |
|---|---|
| | in water. For example, Orotan ™ 1288 polyacrylate dispersant (Orotan is a trademark of Rohm and Haas Company). |
| Defoamer 1 | Paraffinic oil without silicone. For example TEGO ™ antifoam 2290 (TEGO is a trademark of Evonik Degussa GmbH). |

Coating Preparation

Formulations for Comp Exs A-D and Exs 1-5 are listed in Table 2. The amount of each element in each coating formulation is identified in weight-percent of total formulation weight in Table 2.

TABLE 2

| Component | Comp Ex A | Comp Ex B | Comp Ex C | Comp Ex D | Ex 1 | Ex 2 | Ex 3 | Ex 4 | Ex 5 |
|---|---|---|---|---|---|---|---|---|---|
| Polymeric Binder 1 | 78.2 | 0 | 0 | 0 | 0 | 0 | 0 | 0 | 0 |
| Polymeric Binder 2 | 0 | 52.4 | 0 | 0 | 0 | 0 | 0 | 0 | 0 |
| Polymeric Binder 3 | 0 | 0 | 46.9 | 0 | 0 | 14.1 | 13.7 | 17.9 | 21.1 |
| Polymeric Binder 4 | 0 | 0 | 0 | 57.3 | 0 | 0 | 0 | 0 | 0 |
| Polymeric Binder 5 | 0 | 0 | 0 | 0 | 38.1 | 28.2 | 27.3 | 23.8 | 21.1 |
| Additional Water | 0 | 14.1 | 28.1 | 12.6 | 33.9 | 31.6 | 32.2 | 31.5 | 31.5 |
| Expandable Graphite | 16.6 | 16.9 | 12.1 | 15.2 | 13.5 | 12.6 | 12.9 | 12.6 | 12.6 |
| Phosphorous Material 1 | 0 | 11.3 | 9.1 | 10.1 | 10.2 | 9.5 | 9.7 | 9.5 | 9.5 |
| Boron-Containing Material | 4.0 | 4.1 | 3.0 | 3.8 | 3.4 | 3.2 | 2.1 | 2.1 | 2.1 |
| Kaolin clay | 0 | 0 | 0 | 0 | 0 | 0 | 1.1 | 1.1 | 1.1 |
| Dispersant | 0.6 | 0.6 | 0.4 | 0.5 | 0.5 | 0.4 | 0.5 | 0.5 | 0.5 |
| Defoamer 1 | 0.6 | 0.6 | 0.4 | 0.5 | 0.5 | 0.4 | 0.5 | 0.5 | 0.5 |
| Total Phosphorous Concentration | 0 | 3.6 | 2.9 | 3.2 | 3.7 | 3.4 | 3.5 | 3.4 | 3.4 |
| Total Boron Concentration | 0.3 | 0.3 | 0.2 | 0.3 | 0.2 | 0.2 | 0.1 | 0.1 | 0.1 |

Prepare the water based intumescent coatings in the following manner. Weigh the additional water into a beaker and add the defoamer and dispersant. Thoroughly mix using a high speed disperser at 500-800 revolutions per minute for three minutes. Add the boron-containing material and phosphorous material and continue to disperse for another three minutes. Add the expandable graphite and continue mixing for 5-10 minutes at 1200-1500 revolutions per minute. Add the Polymeric Binder and continue mixing at 1250 revolutions per minute for another 3-5 minutes to obtain the intumescent coating formulation.

For coating characterization, use the following characterization procedures. For preparing articles of the present invention apply the intumescent coating formulation onto the primary surface of a polymeric foam. Apply the intumescent coating formulation a desired substrate by painting to a desired thickness. Alternatively, the intumescent coating can be applied by spraying onto a substrate surface. Multiple layers can be applied if desired.

Coating Characterization

Characterize the coating formulations of Comp Exs A-D and Exs 1-5, with Table 3 containing the results of the characterization. Determine tensile elongation and storage modulus as describe prior herein.

Water Resistance. Measure water resistance using the following modified ASTM D870 method. Coat a primary surface of a 10 centimeter (cm) by 10 cm by 2.5 cm extruded polystyrene substrate with 1.5 mm thick (dry thickness) coating of the intumescent formulation. Allow the coating to dry for at least five days prior to testing. Weight the sample for a pre-test weight. Place the sample under water at 23° C. for 24 hours. Remove from water and remove surface water with a towel. Place sample in a freezer at −20° C. for 24 hours. Remove the sample from the freezer and weigh for a post-test weight. Rate the appearance of the coating on the sample using the following scale: 5-excellent, no swelling, blistering or delamination; 4-good, a little swelled, no blistering or delamination; 3-fair, minor delamination; 2-bad, minor blistering or delamination; 1-fail, blistering or delaminated from substrate. Herein, a score of 4 or 5 qualifies as "water resistant".

Fire performance testing was done using a Modified Cone calorimetry Test.

Modified Cone calorimetry Test. The Modified Cone calorimetry Test is ASTM E1354 with a modified distance of sample from the heat source and the wattage of the heat source. Coat a primary surface of a 25 mm thick extruded polystyrene foam board with a 1.5 mm thick (dry thickness) coating of the intumescent coating. Cut the coated foam board into pieces 10 cm by 10 cm and a piece into a sample holder of a Fire Testing Technology cone calorimeter sample holder. In the holder position 40 mm of rockwool on the bottom followed by the coated polymeric foam sample with the intumescent coating exposed at the top. Position a thermocouple on intumescent coating surface and between the rockwool and polymeric foam. Position a cone heater with a 75 kilowatt per square meter flux centered 180 mm above the intumescent coating and record temperatures with the thermocouples for 30 minutes.

The cone calorimetry test was modified for the purpose of better mimicking the temperature profile results from the demanding (and expensive) full wall assembly fire test NFPA 285. The Modified Cone calorimetry Test provides similar temperature profiles to those achieved with a complex full wall assembly test of NFPA 285 but while using a lab-scale test. See, for example, FIG. 1 that provides temperature profiles for a full NFPA 285 test of Comparative Example B over extruded polystyrene compared to temperature profiles as measured in the sample holder (without any sample) in the non-modified cone calorimetry test (ASTM E1354) and the Modified Cone calorimetry Test as described above. The data in FIG. 1 illustrates that the temperature profile of the Modified Cone calorimetry Test more accurately represents results from the full NFPA 285 test.

Expansion Ratio. Determine expansion ratio experiment using a muffle furnace (CARBOLITE, CWF12/5, maximum temperature up to 1200° C. with 2400 Watt (W) heating power) using a 100 milliliter (ml) flat bottom beaker with a diameter of bottom at 5 centimeter (cm). Cut the coating into a circle with 5 centimeter (cm) diameter and placed into bottom of the beaker. Us a heating rate of 17° C./min up to 550° C. The original coating thickness and char thickness was measured using a caliper before and after exposed to heat, and the expansion ratio was calculated by char thickness divided by original coating thickness Char strength evaluation. Qualitatively asses char strength by visual observation and physical assessment of the char structure resulting from thermal exposure test. The char strength was ranked from 1 (weakest) to 5 (strongest). 1: very fluffy, poor cohesion and integrity, unable to withstand physical handling; 3: good cohesion and integrity, maintains physical integrity after physical handling; 5: very good cohesion and integrity, can withstand moderate physical compression.

Tables 3 and 4 present the characterization of Comp Exs A-D and Exs 1-5 samples.

TABLE 3

| Characteristic | Comp Ex A | Comp Ex B | Comp Ex C | Comp Ex D |
|---|---|---|---|---|
| Storage Modulus (Pa at 250° C.) | $1 \times 10^6$ | $5 \times 10^3$ | $1 \times 10^2$ | $1 \times 10^3$ |
| Tensile Elongation (%) | 5 | 300 | 120 | 100 |
| Water Resistance | 5 | 4 | 4 | 4 |
| Expansion Ratio | 10-20 | 15 | 40-60 | 40-60 |
| Ignited (Y/N) | Y | Y | N | N |
| Temperature at backside of Char after 30 minutes in Modified Cone Calorimetry Test (° C.) | 510 | 500 | 450 | 480 |
| Temperature at backside of Char after 30 minutes in Standard Cone Calorimetry Test (° C.) | 485 | 430 | 310 | 295 |
| Char Strength | 5 | 3 | 4 | 3 |

TABLE 4

| Characteristic | Ex 1 | Ex 2 | Ex 3 | Ex 4 | Ex 5 |
|---|---|---|---|---|---|
| Storage Modulus (Pa at 250° C.) | $5 \times 10^3$ | $5 \times 10^3$ | $5 \times 10^3$ | $1 \times 10^3$ | $1 \times 10^3$ |
| Tensile Elongation (%) | 50 | 70 | 80 | 80 | 90 |
| Water Resistance | 4 | 4 | 4 | 4 | 4 |
| Expansion Ratio | 15 | 20 | 20 | 25 | 30 |
| Ignited (Y/N) | N | N | N | N | N |
| Temperature at backside of Char after 30 minutes in Modified Cone Calorimetry Test (° C.) | 318 | 307 | 204 | 204 | 191 |
| Char Strength | 4 | 4 | 4 | 4 | 3 |

Cone calorimetry Test Results. The data in Table 3 reveals that some samples appear to have a temperature below 400° C., even below 350° C. in the Standard Cone calorimetry Test, but demonstrate a temperature well above 400° C. in the Modified Cone calorimetry Test, which more accurately mimics temperature profiles for the NFPA 285 large scale testing. Therefore, Modified Cone calorimetry Test results are more difficult to achieve a temperature below 400° C., even below 350° C. yet are more valuable for screening suitable intumescent coatings.

Tensile Elongation. Samples having a tensile elongation percentage of 100 or higher demonstrate excessively high surface temperature of the foam in the cone calorimetry testing. It is a hypothesis that the coatings with a tensile elongation of 100% or more are too soft to sustain a foamed char so the resulting char does not have an insulating effect for the foam over which it resides. In contrast, samples having a tensile elongation of less than 50% also demonstrate excessively high surface temperature of the foam in the cone calorimetry testing.

The intumescent coatings of Exs 1-5 can be applied on a polymeric foam board either by painting or spraying to achieve an article of the present invention.

Solvent-Free Intumescent Coatings

Comp Ex E and Exs 6-9 are made using a solvent-free two-component (2k) polyurethane foam system. For the 2k polyurethane foam system the polymeric binder is made by mixing a polyol component with an isocyanate component. The polyol and isocyanate components used for these samples are described in Table 5, along with other components used in these samples.

TABLE 5

| Component | Description |
|---|---|
| Polyol 1 | Glycerine propoxylated polyether triol with a hydroxyl number of approximately 156 mg KOH/g. For example, VORANOL ™ CP1055 polyol. VORANOL is a trademark of The Dow Chemical Company. |
| Polyol 2 | A polyester polyol produced form purified terephthalic acid (37 wt %), glycerin (8 wt %) diethylene glycol (17 wt %), and polyethylene glycol (200 g/mol molecular weight, 38 wt %) and having a hydroxyl number of 315. |
| Isocyanate 1 | Polymeric methylene diphenyl diisocyanate (MDI) with functionality of 2.7, equivalent weight of 134 and 31.4 wt % -NCO with about 42 wt % monomeric MDI. For example, PAPI ™ 27 polymeric MDI (PAPI is a trademark of The Dow Chemical Company). |
| Isocyanate 2 | Isocyanate prepolymer that is 300 gram/mole polyethylene glycol reacted with MDI. For example VORAMER ™ MN 300 prepolymer. VORAMER is a trademark of The Dow Chemical Company. |
| Phosphorous Material 2 | Melamine phosphate (MPP). For example, JLS-PNA from Hangzhou JLS Chemical Company, China. |
| Phosphorous Material 3 | Tris(chloropropyl) phosphate |
| Phosphorous Material 4 | Triethyl phosphate (TEP) |
| Surfactant | Silicone copolymer surfactant having a hydroxyl number of 40 milligrams KOH/gram. For example, NIAX ™ silicone L6900 copolymer. NIAX is a trademark of Momentive Performance materials, Inc. |
| Defoamer 2 | Solutions of silicon-free polymeric defoamers. For example BYK ™ A535 silicon-free air release additive. BYK is a trademark of BYK-Chemie GmbH. |
| Catalyst | Dibutyltin dilaurate |

Coating Preparation

Formulations for the solvent-free intumescent coatings are in Table 6, with values for each component representing weight-percent of that component relative to total formulation weight.

TABLE 6

| Component | Comp Ex E | Ex 6 | Ex 7 | Ex 8 | Ex 9 |
|---|---|---|---|---|---|
| Polyol 1 | 0 | 11.7 | 12.5 | 12.5 | 29.6 |
| Polyol 2 | 27.7 | 0 | 0 | 0 | 0 |
| Isocyanate 1 | 50 | 0 | 0 | 0 | 17.6 |
| Isocyanate 2 | 0 | 31.1 | 33.3 | 33.3 | 0 |
| Phosphorous Material 3 | 2.5 | 9.3 | 6.0 | 6.0 | 3.2 |
| Phosphorous Material 4 | 2.3 | 9.3 | 6.0 | 6.0 | 3.2 |
| Expandable Graphite | 16.8 | 35.4 | 26.9 | 26.9 | 25.7 |
| Phosphorous Material 1 | 0 | 0 | 11.9 | 0 | 0 |
| Phosphorous Material 2 | 0 | 0 | 0 | 11.9 | 12.8 |

TABLE 6-continued

| Component | Comp Ex E | Ex 6 | Ex 7 | Ex 8 | Ex 9 |
|---|---|---|---|---|---|
| Boron-containing material | 0 | 2.8 | 3.0 | 3.0 | 7.5 |
| Surfactant | 0.2 | 0.2 | 0.2 | 0.2 | 0.2 |
| Defoamer 2 | 0 | 0.2 | 0.2 | 0.2 | 0.2 |
| Catalyst | 0.7 | 0.04 | 0.04 | 0.04 | 0.04 |
| Total Phosphorous Concentration | 0.6 | 2.2 | 5.7 | 3.1 | 2.5 |
| Total Boron Concentration | 0 | 0.2 | 0.2 | 0.2 | 0.5 |

Prepare and apply intumescent coatings in the following manner.

Prepare an "A" component as follows. Weight the Isocyanate and Phosphorous Material into a beaker and mix together for one minute using a disperser at 800 revolutions per minute. Add the Surfactant and Defoamer and continue mixing at 1000 revolutions per minute for one minute. Add Boron-containing material and phosphorous materials and continue dispersing at 1200 revolutions per minute for five minutes. Add the Expandable Graphite and continue missing ate 1200-1500 revolutions per minute for 5-10 minutes.

Prepare a "B" component by adding the catalyst and polyols to another beaker and mix the polyols and catalyst together.

Mix the "A" component and the "B" component together at 1500 revolutions per minute for three minutes and apply to a substrate to obtain an intumescent coating on that substrate. Apply to the primary surface of a polymeric foam to achieve an article of the present invention. Application to a substrate can occur by painting, pouring or spraying.

Coating Characterization

Characterize the coating formulations of Comp Ex E and Exs 6-9 in like manner as for Comp Exs A-D and Exs 1-5. Table 7 contains characterization results.

TABLE 7

| Characteristic | Comp Ex E | Ex 6 | Ex 7 | Ex 8 | Ex 9 |
|---|---|---|---|---|---|
| Storage Modulus (Pa at 250° C.) | $1 \times 10^6$ | $1 \times 10^4$ | $5 \times 10^3$ | $5 \times 10^3$ | $1 \times 10^5$ |
| Tensile Elongation (%) | 5 | 70 | 70 | 70 | 50 |
| Water Resistance | 5 | 5 | 5 | 5 | 5 |
| Expansion Ratio | 5-10 | 30 | 30 | 30 | 20 |
| Ignited (Y/N) | Y | N | N | N | N |
| Temperature at backside of Char after 30 min. in the Modified Cone Calorimetry Test (° C.) | 745 | 280 | 350 | 352 | 294 |
| Char Strength | 5 | 3 | 3 | 3 | 4 |

The data in Table 7 reveals coatings having 50-70% tensile elongation at 23° C. and storage modulus of less than $10^6$ Pascals at 250° C. demonstrate surface temperatures of 350° C. or lower in the Modified Cone calorimetry Test. Additionally, all of the coatings are water resistant.

Demonstrations on Different Polymeric Foams

Examples 3 and 9 serve as representative water based intumescent coatings and solvent free intumescent coatings, respectively, for coating and characterizing extruded polystyrene (XPS), expanded polystyrene (EPS) and polyisocyanurate (PR) foam boards. The XPS foam board is as described previously in this Example section. The EPS foam board has a density of 22 kilograms per cubic meter and the PU foam board has a density of 28 kilograms per cubic meter.

The intumescent coatings were applied to a primary surface of the foam boards at two different coating weights and thicknesses. Results for Example 3 and 9 coatings are in Table 8. Coating weight is reported as wet coating weight in kilograms per square meter (kg/m²). Coating thickness is reported in dry coating thickness in millimeters (mm).

TABLE 8

| Characteristic | Coating weight | Coating Thickness | Ex 3 (waterborne) | Ex 9 (solvent free) |
|---|---|---|---|---|
| Storage Modulus (Pa at 250° C.) | | | $5 \times 10^3$ | $1 \times 10^5$ |
| Tensile Elongation (%) | | | 80 | 50 |
| Water Resistance | | | 4 | 5 |
| Expansion Ratio | | | 20 | 20 |
| Temperature at backside of Char after 30 min. in Modified Cone Calorimetry Test (° C.) on XPS foam | 1.0 kg/m² | 0.6 mm | 345 (No Ignition) | 342 (No Ignition) |
| | 2.9 kg/m² | 1.8 mm | 204 (No Ignition) | 273 (No Ignition) |
| Temperature at backside of Char after 30 min. in Modified Cone Calorimetry Test (° C.) on EPS foam (foam density = 22 kg/m³) | 1.0 kg/m² | 0.6 mm | 352 (No Ignition) | 276 (No Ignition) |
| | 2.9 kg/m² | 1.8 mm | 202 (No Ignition) | 186 (No Ignition) |
| Temperature at backside of Char after 30 min. in Modified Cone Calorimetry Test (° C.) on rigid PIR foam (foam density = 28 kg/m³) | 1.0 kg/m² | 0.6 mm | 374 (No Ignition) | 313 (No Ignition) |
| | 2.9 kg/m² | 1.8 mm | 123 (No Ignition) | 212 (No Ignition) |

The results in Table 8 illustrate that the examples of the present invention provides desirable fire protection (indicated by having a surface temperature on back side of char below 400° C.) of a variety of types of polymeric foam at intumescent coating thicknesses ranging from 0.6 to 1.8 mm.

The invention claimed is:

1. An article comprising a polymeric foam board having a primary surface and an intumescent coating on the primary surface of the polymeric foam board, the intumescent coating being free of any blowing or expansion agent other than expandable graphite and comprising:
   a. a polymeric binder comprising a polyurethane having a tensile elongation of 50% or more;
   b. expandable graphite particles dispersed within the polymeric binder, the expandable graphite particles having an onset temperature in a range of 150 to 200 degrees Celsius as determined by thermal mechanical analysis, an average particle size in a range of 0.07 to 0.60 millimeters as determined according to ASTM D1921-06 and a concentration of 15 to 80 weight-percent based on total weight of intumescent coating;
   c. a phosphorous material that provides phosphorous at a concentration of 2 to 15 weight-percent based on total weight of intumescent coating; and
   d. a boron-containing compound that provides a boron concentration in a range of greater than zero to two weight-percent based on total intumescent coating weight;
where the article is free of an object that is in contact with the intumescent coating and that sandwiches the intumescent coating between the object and the polymeric foam board and wherein the intumescent coating has a tensile elongation of at least 50 percent and less than 100 percent at 23 degrees Celsius as measured according to ISO 37, has a storage modulus of less than 1×106 Pascals at 250 degrees Celsius, is halogen-free, free of sodium silicate, free of polyurea elastomer, and free of formals of pentaerythritol and dipentaerythritol.

2. The article of claim 1, wherein the polymeric foam board is a thermoplastic polymer foam board.

3. The article of claim 1, wherein the polymeric foam board comprises more than 50 weight-percent styrenic polymer based on total polymer weight in the polymeric foam board.

4. The article of claim 1, wherein the expandable graphite particles have an onset temperature in a range of 150 to 170 degrees Celsius and an average particle size in a range of 0.25 to 0.35 millimeters.

5. The article of claim 1, wherein the phosphorous material is any one or any combination of more than one material selected from a group consisting of ammonium polyphosphate phase I, ammonium polyphosphate phase II, melamine formaldehyde resin modified ammonium polyphosphate, silane modified ammonium polyphosphate, melamine polyphosphate, bisphenol A bis(diphenyl phosphate), cresyldiphenyl phosphate, dimethylpropane phosphonate, polyphosphonates, metal phosphinate, phosphorous polyol, phenyl phospholane, polymeric diphenyl phosphate, resorcinol-bis-diphenylphosphate, triethyl phosphate, tricresyl phosphate, triphenyl phosphate, red phosphors, phosphate acid, and ammonium phosphate.

6. The article of claim 1, wherein the intumescent coating is free of perforations.

7. The article of claim 1, wherein the intumescent coating has a dry thickness in a range of 0.6 to 1.8 millimeters on the polymeric foam board.

* * * * *